(12) United States Patent
Nakagaki et al.

(10) Patent No.: US 8,166,353 B2
(45) Date of Patent: Apr. 24, 2012

(54) MEMORY MANAGEMENT APPARATUS

(75) Inventors: Yoshio Nakagaki, Toyota (JP); Takeshi Suganuma, Kariya (JP)

(73) Assignee: Denso Corporation, Kariya (JP)

( * ) Notice: Subject to any disclaimer, the term of this patent is extended or adjusted under 35 U.S.C. 154(b) by 862 days.

(21) Appl. No.: 12/185,282

(22) Filed: Aug. 4, 2008

(65) Prior Publication Data

US 2009/0037780 A1    Feb. 5, 2009

(30) Foreign Application Priority Data

Aug. 3, 2007  (JP) .................................. 2007-203108

(51) Int. Cl.
G06F 11/00 (2006.01)
G11C 29/00 (2006.01)
G01M 17/00 (2006.01)

(52) U.S. Cl. ............ 714/703; 714/723; 702/183; 701/29

(58) Field of Classification Search .................. 714/703, 714/723, 763; 702/183; 701/29, 33
See application file for complete search history.

(56) References Cited

U.S. PATENT DOCUMENTS

| 6,957,135 | B2 | 10/2005 | Okada et al. | |
|---|---|---|---|---|
| 7,865,804 | B2 * | 1/2011 | Blevins | 714/763 |
| 7,869,917 | B2 * | 1/2011 | Morozumi | 701/34 |
| 7,984,362 | B2 * | 7/2011 | Golub et al. | 714/775 |
| 2005/0143882 | A1 | 6/2005 | Umezawa | |
| 2005/0159923 | A1 | 7/2005 | Huang | |
| 2005/0171735 | A1 | 8/2005 | Huang | |
| 2007/0180318 | A1 | 8/2007 | Morozumi | |
| 2008/0155384 | A1 * | 6/2008 | Golub et al. | 714/798 |
| 2008/0221751 | A1 * | 9/2008 | Fink et al. | 701/35 |

FOREIGN PATENT DOCUMENTS

| JP | 10-320295 | 12/1998 |
|---|---|---|
| JP | 2002-99467 | 4/2002 |
| JP | 2004-21520 | 1/2004 |
| JP | 2004-021520 | 1/2004 |
| JP | 2004-164601 | 6/2004 |
| JP | 2005-156165 | 6/2005 |
| JP | 2005-196515 | 7/2005 |
| JP | 2005-301671 | 10/2005 |
| JP | 2006-286111 | 10/2006 |

(Continued)

OTHER PUBLICATIONS

Extended European Search Report dated Mar. 31, 2010, issued in corresponding European Application No. 08013847.2-1225.

(Continued)

Primary Examiner — Cynthia Britt
(74) Attorney, Agent, or Firm — Nixon & Vanderhye P.C.

(57) ABSTRACT

A fault code memory management apparatus stores a permanent fault code in different places of a non-volatile memory, and restore the fault code when an error is detected in the fault code stored in the different places in a manner that, in case that discrepancy between the fault codes in different places is found, the fault code matching with data in a code table stored in a read-only memory is determined to be correct. If two fault codes have matching data in the code table, the fault code is compared with data in a standby random access memory that stores an original fault code data. Further, the data in the random access memory and the data in the code table are compared if the comparison between the code and the data in the random access memory is not sufficient.

45 Claims, 12 Drawing Sheets

FOREIGN PATENT DOCUMENTS

JP 2006-323777 11/2006

OTHER PUBLICATIONS

"Multifunction and Diagnostic System Requirements for 2004 and Subsequent Model-Year Passenger Cars, Light-Duty Trucks, and Medium-Duty Vehicles and Engines", Title 13, California Code Regulations, Section 1968.2 (OBD II).

U.S. Appl. No. 12/180,754, Hiroyuki Enomoto et al., filed Jul. 28, 2008, (JP 2007-203109 and JP 2007-295490).

U.S. Appl. No. 12/185,274, Teramura, filed Aug. 4, 2008, (JP 2007-203110).

European Search Report dated Aug. 26, 2010, issued in corresponding European Application No. 08 013 847.2-1225.

* cited by examiner

MEMORY MANAGEMENT APPARATUS

CROSS REFERENCE TO RELATED APPLICATION

The present application is based on and claims the benefit of priority of Japanese Patent Application No. 2007-203108 filed on Aug. 3, 2007, the disclosure of which is incorporated herein by reference.

FIELD OF THE INVENTION

The present disclosure generally relates to a memory management apparatus for storing a fault code in a non-volatile memory and for detecting an error in the fault code.

BACKGROUND INFORMATION

Conventionally, the electronic control unit (ECU) for controlling various parts of a vehicle typically performs diagnosis for detecting a fault of a predetermined diagnosis object and stores, in a semiconductor memory capable of rewriting contents such as an SRAM, an EEPROM or the like, a fault code of the detected fault in case a fault is detected. The semiconductor memory is usually disposed in the ECU. The SRAM is a volatile memory that is configured to have a continuous power supply from a vehicle battery. The EEPROM is a non-volatile memory.

The ECU is, for example, configured to transmit the fault code to an external diagnosis device by reading the code from the SRAM when the ECU receives a fault code request from the external diagnosis device that is communicable through communication channel.

In this case, the fault code lost from the SRAM due to the removal of the vehicle battery causing the loss the power supply, due to a defect in the SRAM or the like is restored by reading the code stored in the EEPROM and writing the code in the SRAM. The fault code may be configured to be read from the EEPROM and to be transmitted to the diagnosis device when the ECU receives the fault code request from the diagnosis device.

The fault code stored in the non-volatile memory may be, for some reason, rewritten or turned to different data in some cases.

In view of the above-described cases, the technique disclosed in, for example, Japanese patent documents JP-A-2005-196515 or JP-A-2006-286111 describes a method for detecting rewritten to fault data and for restoring a correct data from the fault data.

For example, in the description of the patent document JP-A-2005-196515, the method describes how to restore the correct data based on comparison of same data stored in three different places. More practically, the method determines that the data is correct if at least two data out of three match with each other. Three data matching with each other is also considered to be correct. Further, when at least two data out of three are matching, the two matching data are determined to be correct data, and the rest is determined to be incorrect. Furthermore, in the description of the document, the method rewrites the data that has been determined to be correct in a memory area that stores the data that has been determined to be incorrect for data restoration of the correct data from the incorrect data.

The description of JP-A-2006-286111 discloses a similar technical idea.

However, the method and idea in the above-mentioned documents can not determined the correct fault code if the three different memory areas in the non-volatile memory store respectively different fault codes, that is, if the same codes stored in the three different areas are turned to be respectively different three codes.

Therefore, the fault code in the SRAM may not be correctly restored when the fault code in the SRAM is lost. In other words, the fault code request from the external diagnosis device may not have the correct fault code transmitted in response. The fault code directly retrieved from the non-volatile memory does not solve the problem because there is no clue to determine which one of the fault codes in the non-volatile memory is correct.

Further, in a case that at least two fault codes out of three in the non-volatile memory are turned to the incorrect fault codes and the fault codes after being turned accidentally match with each other the incorrect code is considered to be correct. In that case, the ECU transmits the incorrect fault code to the external diagnosis device in response to the fault code request from the diagnosis device.

SUMMARY OF THE INVENTION

In view of the above and other problems, an aspect of the present invention provides a memory management apparatus that stores the same fault code in respectively different places in a non-volatile memory and detects an error in the stored fault code in an improved manner in case of having the error in the code.

A fault code memory management apparatus of the present invention includes: a memory management unit capable of storing a same fault code of a detection object in a vehicle at respectively different memory areas of a non-volatile memory, wherein the fault code of the detection object represents a detected fault of the object, and wherein information in the non-volatile memory is both readable and writable; and an error detection unit capable of detecting an error of the fault code in the non-volatile memory upon detecting discrepancy of at least one of the same fault codes stored at respectively different memory areas through performing a mutual matching of the fault code.

Further, the memory management apparatus includes: an information table memory capable of storing a fault code table to be stored in the non-volatile memory, wherein the fault code table is an information table that includes the fault codes; and an authentication unit capable of authenticating the fault code as a genuine fault code by comparing each of the fault codes stored at respectively different areas in the non-volatile memory with the fault code included in the fault code table when the error detection unit at least detects the error of the fault code in the non-volatile memory, wherein the fault code is determined as the genuine fault code when the authentication unit recognizes that the fault code is included in the fault code table.

Because the fault code table includes the fault codes to be stored in the non-volatile memory, a fault code from the non-volatile memory is an incorrect fault code if that fault code is not included in the fault code table. In other words, a fault code from the non-volatile memory has a higher possibility of being correct if that fault code is included in the fault code table.

Therefore, the fault code memory management apparatus can recognize the correct fault code from among the respectively different fault codes stored in different memory areas in the non-volatile memory by comparing the fault code in the non-volatile memory with the fault code table. That is, the apparatus can recognize which one of the fault codes in the respectively different fault codes should be stored in the nonvolatile memory in the above-described manner. In other words, the correct fault code is restored from the remaining correct code even when the same fault codes stored in the different memory areas in the non-volatile memory are turned to be respectively different codes.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
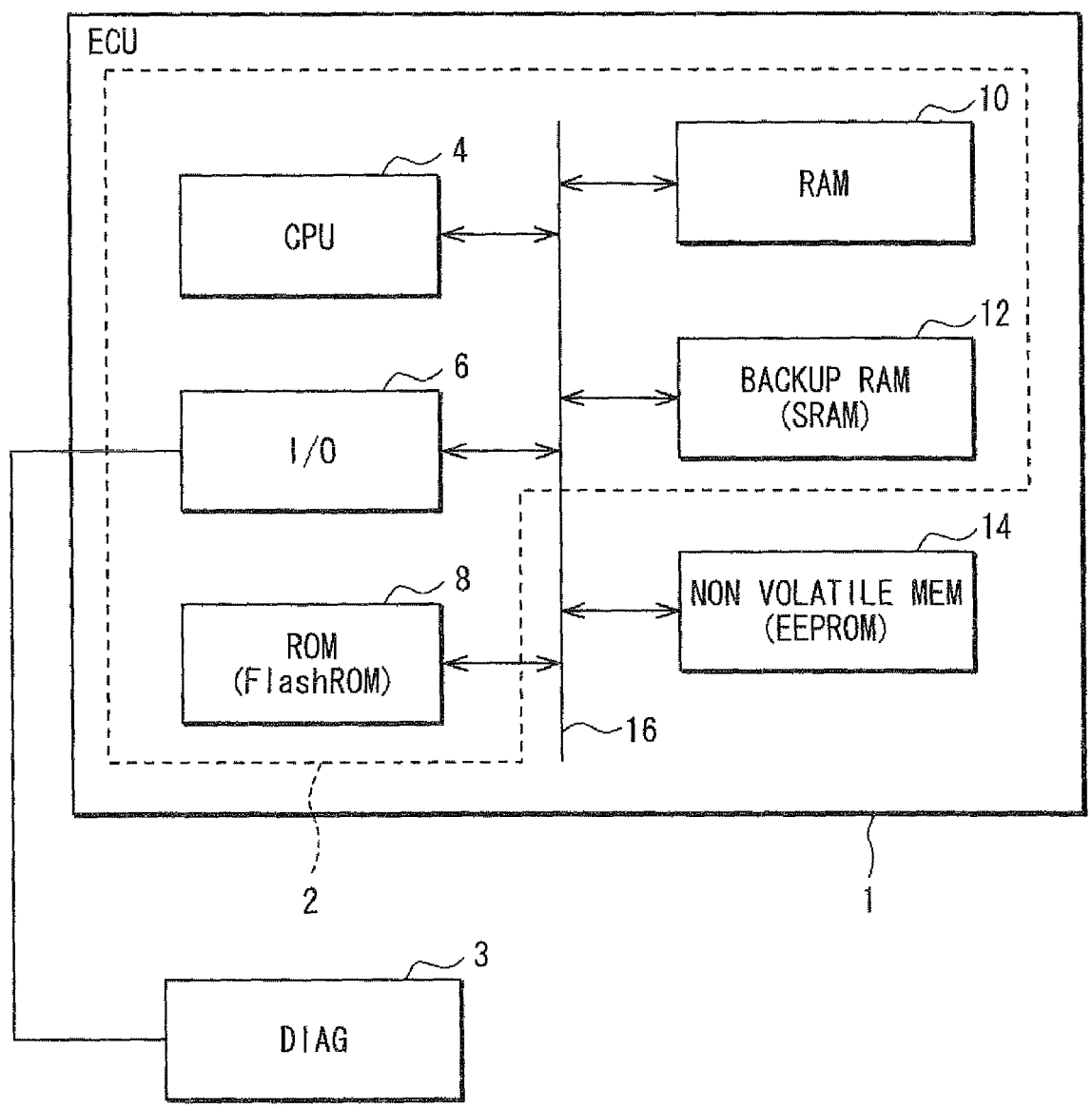
FIG. 1 is a configuration diagram of an electronic control unit in an embodiment of the present invention.

In the following, an embodiment of the present invention is explained based on the drawing. FIG. 1 is a configuration of an electronic control unit (it is mentioned as an ECU in the following) 1 which the present invention is applied to. The ECU 1 is a device to control each component of the vehicle.

The ECU 1 includes a microcomputer 2 and an EEPROM 14 as the nonvolatile memory. As for the microcomputer 2, a CPU 4 carrying out various processing according to a predetermined program, a ROM 8 storing the program carried out by the CPU 4, a RAM 10 storing information such as a calculation result of the CPU 4 and the like, a backup RAM 12 (designated as SRAM 12 hereinafter) retaining data with a continuous supply of voltage from vehicle battery (not shown in the drawing), an interface (I/O) 6 connecting an external electronic device, and a bus 16 interconnecting above components are included therein.

The CPU 4 operates according to a program for diagnosis which is stored in the ROM 8, and detects whether the vehicle has experienced trouble or not. The CPU 4 stores in the SRAM 12 and the EEPROM 14 a trouble code (DTC: Diagnostic Trouble Codes) when trouble is detected. More practically, the CPU 4 stores in the SRAM 12 the DTC, and the CPU 4 stores in the EEPROM 14 the same data as the DTC that has been stored in the SRAM 12 as a permanent trouble code (PDTC: Permanent Diagnostic Trouble Codes, i.e., Permanent fault code). In addition, the EEPROM 14 stores the PDTC as is required by law.

In the following, the trouble code is designated as DTC, and in particular, the trouble code stored in the EEPROM 14 is designated as PDTC. A diagnosis device 3 is a device which diagnoses a state of the vehicle having the ECU 1 installed therein by acquiring a trouble code from the ECU 1. The diagnosis device 3 is, through the I/O 6, connected to the microcomputer 2 of the ECU 1. For example, a service representative connects the diagnosis device 3 to the ECU 1 in a communicable condition in a repair shop, a dealer or the like.

When a request to send the trouble code is transmitted from the diagnosis device 3, the microcomputer 2 retrieves the DTC memorized in the SRAM 12, and the retrieved DTC is transmitted to the diagnosis device 3. Data in the SRAM 12 are restored by writing the PDTC which has been stored in the EEPROM 14 in the SRAM 12 when, due to loss of a power supply by removing the vehicle battery from the vehicle or due to abnormality of the SRAM 12 causing initialization, the DTC memorized in the SRAM 12 disappeared.

Figure 2:
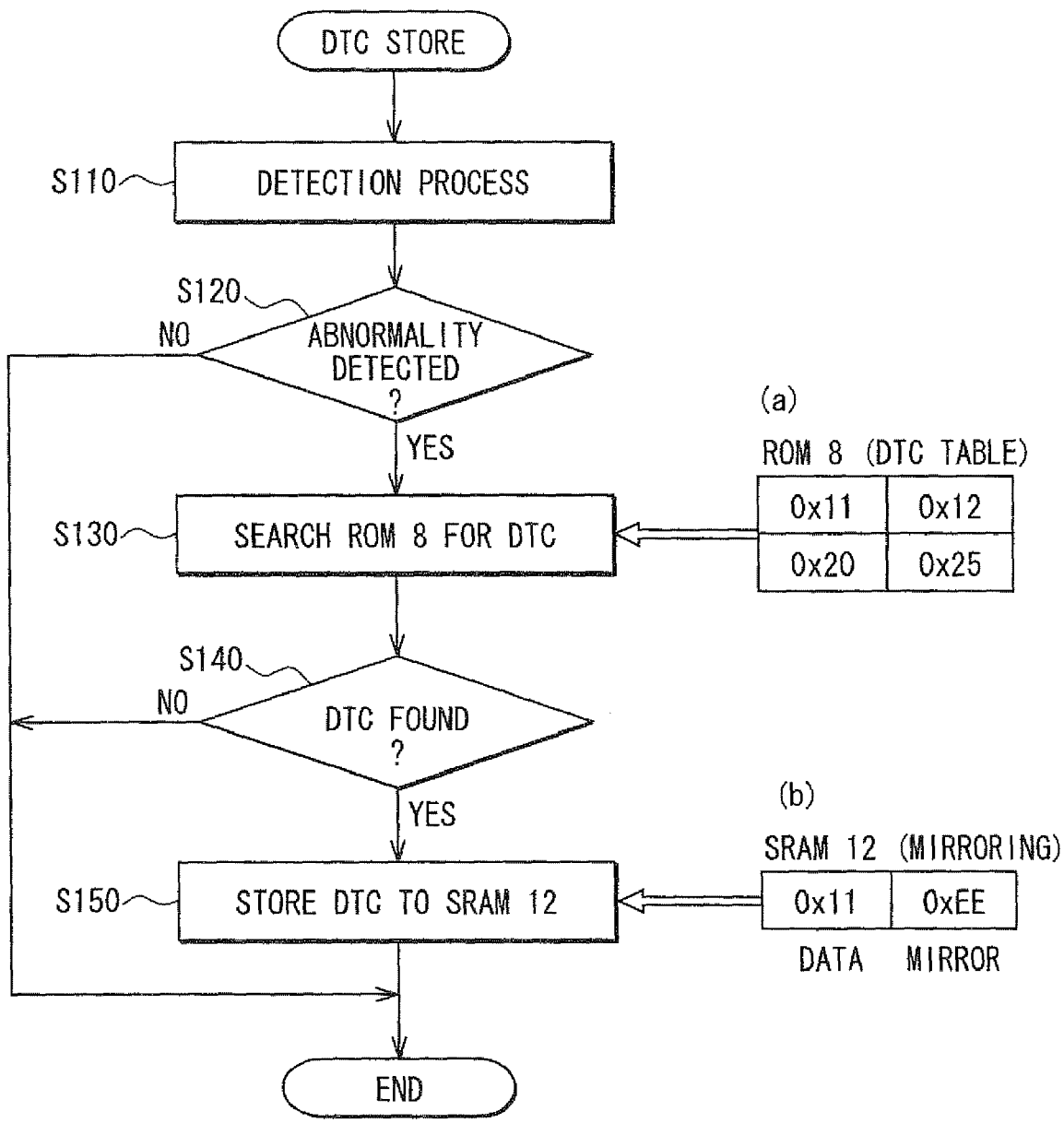
FIG. 2 is a flowchart showing a DTC store processing executed by a CPU of the electronic control unit.

FIG. 2 is a flowchart representing a DTC store processing that the CPU 4 carries out. For example, the DTC store processing is performed at least once for each of an abnormality detection object in, for example, a trip period (i.e., a period between a turn-on and a turn-off of the vehicle ignition switch, or a period between a turn-on and a subsequent turn-on of the switch: each of the two definitions are used in the present embodiment). Execution timing of the diagnosis may be set arbitrarily.

At first, in the DTC store processing, whether or not there is abnormality in a predetermined detection object is determined to in S110. Then the process proceeds to S120, and it is determine whether there is abnormality based on an abnormality determination in S110, and when it is determined that there is no abnormality (S120: NO), the processing concerned is simply finished.

On the other hand, when abnormal is determined to be existing in S120 (S120: YES), the process proceeds to S130, and the DTC (object DTC) corresponding to the detected abnormality is searched for in the DTC table stored in the ROM 8, which is mentioned later. The DTC table is a table memorizing all trouble codes, one or more of which might be memorized in the SRAM 12 and the EEPROM 14, required for the vehicle on which the ECU 1 is assembled. The example of the DTC table is shown in the FIG. 2 in an (a) portion In the example of FIG. 2, a DTC table storing four DTC's of 0x11, 0x12, 0x20, and 0x25 is shown. The DTC represents, by using lower two digits, a code (a numerical value) in the hexadecimal notation serving as a main part of the DTC. The upper two digits of the DTC serve as an indicator that the lower two digits are in the hexadecimal notation.

After S130, S140 follows in the processing, and whether the DTC (an object DTC) representing the currently detected abnormality is stored in the DTC table (for example, the (a) portion in FIG. 2 is referred to) in the ROM 8.

When it is determined that the object DTC is not memorized in the DTC table in the ROM 8 in S140 (S140: NO), it is determined that the DTC needs not be memorized about the currently detected abnormality or the DTC is assigned to the currently detected abnormality, and the processing concerned is simply finished.

On the other hand, S150 follows in the processing when it is determined that the object DTC is memorized in the DTC table in the ROM 8 in S140 (S140: YES). In S150, the DTC memorized in the DTC table representing the abnormality currently detected is stored in the SRAM 12. Then, the processing concerned is finished.

The sequence of processing is, for example, the abnormality detected by a sensor (S120: YES) is examined if the DTC corresponding to the abnormality of the sensor is stored in the DTC table, and if it is stored (S140: YES), the DTC of 0x11 in this case is stored in the SRAM 12 (S150).

In addition, in S150, the processing lets the SRAM 12 memorize DTC by a mirror method. More practically, the processing stores original data together with reverse data that is derived from the original data. If we take 0x11 as an example, 0x11 together with 0xEE are stored due to the method of data mirroring. That is, when 0x11 is "mirrored," data having a value that adds up to the value FF is used as a mirrored data. In this case, the value EE added to 11 makes the value FF. In other words, the mirrored data 0xEE derived from 0x11 represents the "same" contents as the 0x11. Or, still in other words, 0x11 serves as a mirrored data for 0xEE. The reason why the data is mirrored is, for example, that the data reliability check is performed by mirror checking (That is, the reliability of the original data is checked by examining if the original data and the mirrored data add up to FF, with a recovery process by initializing the SRAM 12 if the sum of the original and mirrored data is not equal to FF.) in a case that the data in the SRAM 12 is, for some reason, rewritten or damaged.

Figure 3:
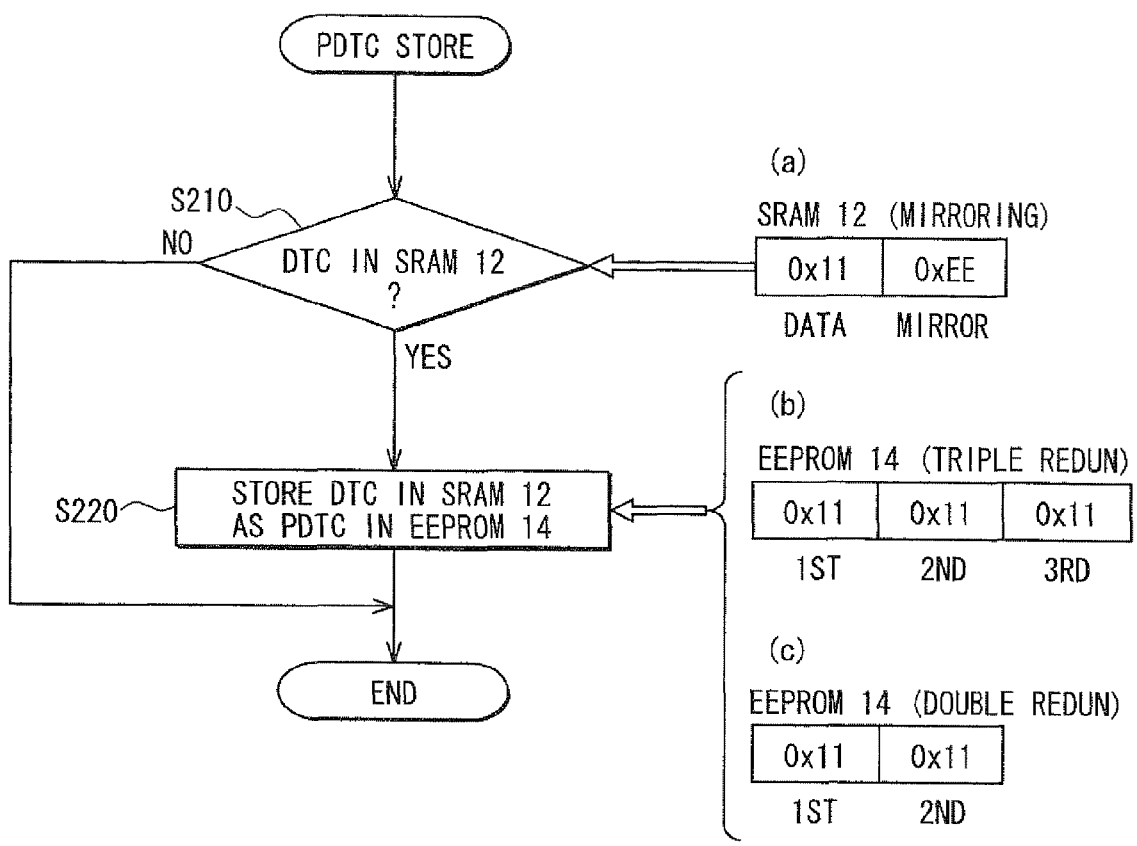
FIG. 3 is a flowchart showing a PDTC store processing executed by the CPU of the electronic control unit.

FIG. 3 is a flowchart representing a PDTC store processing that the CPU 4 carries out. It is a processing to let the EEPROM 14 memorize, as the PDTC, the DTC stored in the SRAM 12. In addition, for example, the processing is carried out at least once in a trip period. Further, it may be carried out several times regularly in a trip period.

At first, in the PDTC store processing, the processing concerned simply is finished when it is determined that the DTC is not memorized in the SRAM 12 in S210 (S210: NO) after determining whether the DTC is memorized in the SRAM 12. In addition, the DTC is memorized by a mirror method as mentioned above if the DTC is memorized in the SRAM 12 (cf. an (a) portion in FIG. 3).

On the other hand, when it is determined that DTC is memorized in the SRAM 12 in S210 (S210: YES), S220 follows in the processing, and the DTC memorized in the SRAM 12 is stored as PDTC in the EEPROM 14. Among the storage areas in the EEPROM 14, the same PDTC is stored in pre-assigned three areas in the case (FIG. 3, a (b) portion). Or, among the storage areas in the EEPROM 14, pre-assigned two areas are used for storing the same PDTC (FIG. 3, a (c) portion). In the following description, the former one is designated as a double redundancy method, and the latter one is designated as triple redundancy method.

As shown in the (b) portion of FIG. 3, the PDTC (for example, 0x11) is memorized in three places in the triple redundancy method, and the PDTC (for example, 0x11) is memorized in two places in the double redundancy method as shown in the (c) portion of FIG. 3. In addition, in either of the triple redundancy method or the double redundancy method, the CPU 4 writes and reads the PDTC area by area, and determines that the PDTC is normally written upon checking an agreement of the read data with the written data. Then, the processing in S220 is finished when the CPU 4 determines that all areas have the normally written PDTC by going through each of the storage areas.

And, after the processing in S220, the processing concerned is simply finished.

FIGS. 4 to 12 are used for describing the checking process of the reliability of the PDTC memorized in the EEPROM 14. Both of the double redundancy method and the triple redundancy method are described in terms of storing the PDTC in the EEPROM 14 in this case.

First, the double redundancy method is described with reference to FIGS. 4 to 8. In this case, the assumption is that 0x11 is memorized in the EEPROM 14 in two places, and the DTC table has the same configuration same as FIG. 2 in the (a) portion.

In addition, the processing of FIG. 4-FIG. 8 is carried out at least once in a trip period. Or, the processing is started by the timing when the request to send of the trouble code is received from the diagnosis device 3. First, in S310, by the processing of FIG. 4, the PDTCs memorized in the EEPROM 14 in two places, respectively, are compared.

When S320 follows subsequently in the processing, upon determining that the PDTCs in two places are matching (S320: YES), it is determined that, based on a comparison result of S310, there is no abnormality (the PDTC is reliable), and the processing concerned is simply finished.

On the other hand, in S320, when the PDTC memorized in two places is determined not to be matching (S320: NO), the process proceeds to S330, and the two types of PDTC stored in the two places are respectively compared with the DTC table of the ROM 8. More practically, each of the two types of PDTC's is examined if any of the plural types of DTC in the DTC table is matching with them.

Figure 5:
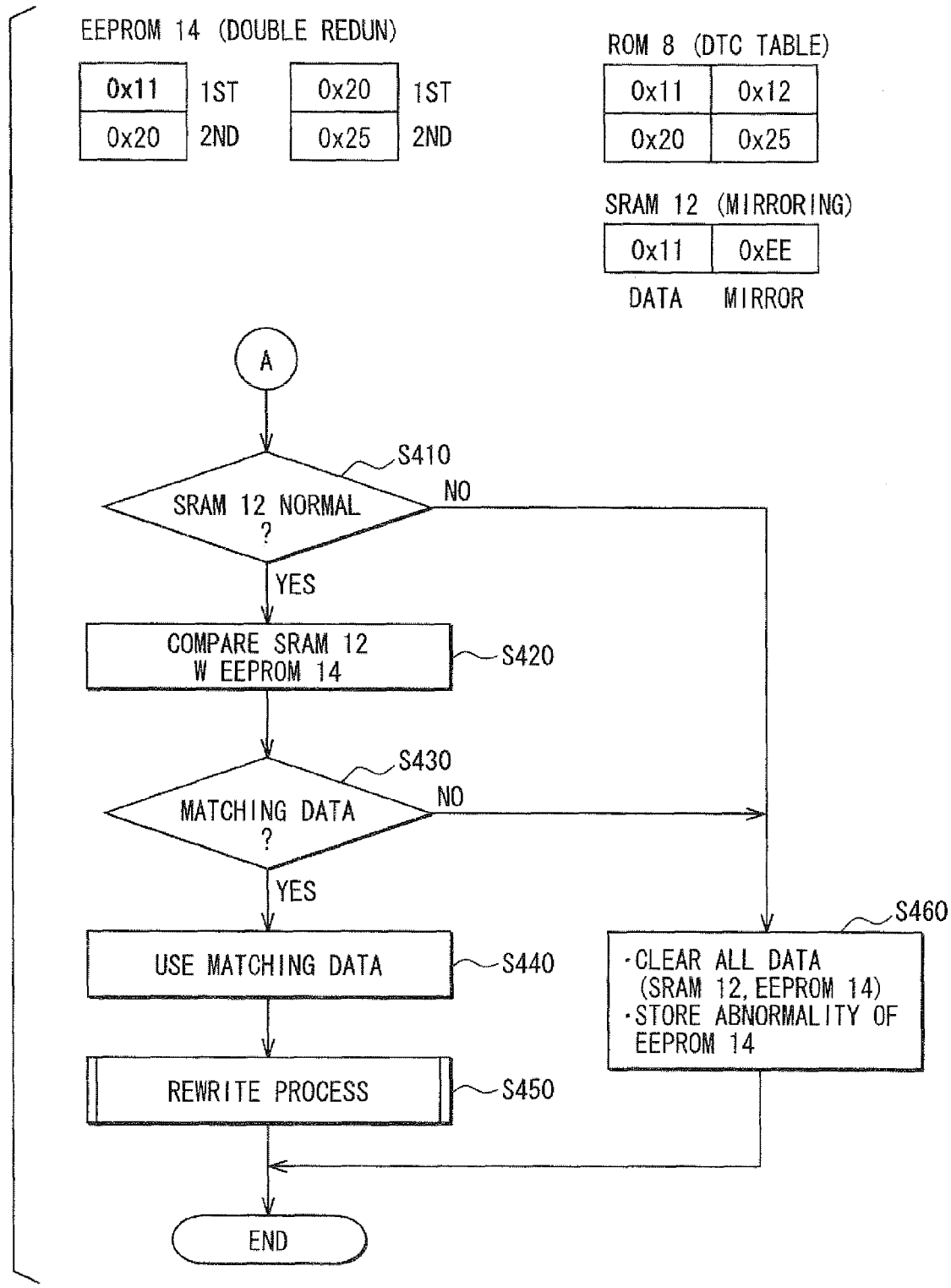
FIG. 5 is another flowchart showing a PDTC reliability checking processing for the PDTC in the EEPROM executed by the CPU of the electronic control unit.

Then, S340 follows in the processing, and it is determined whether the PDTC's in the two places are included in the DTC table based on a comparison result of S330, and the process proceeds to the one shown in FIG. 5 if it is determined that the DTC table includes both of the PDTC's. The process proceeds to the one shown in FIG. 6 if it is determined that only one of the two PDTC's is in the DTC table. The process proceeds to the processing in FIG. 7 if it is determined that none of the PDTC's is in the DTC table.

Figure 4:
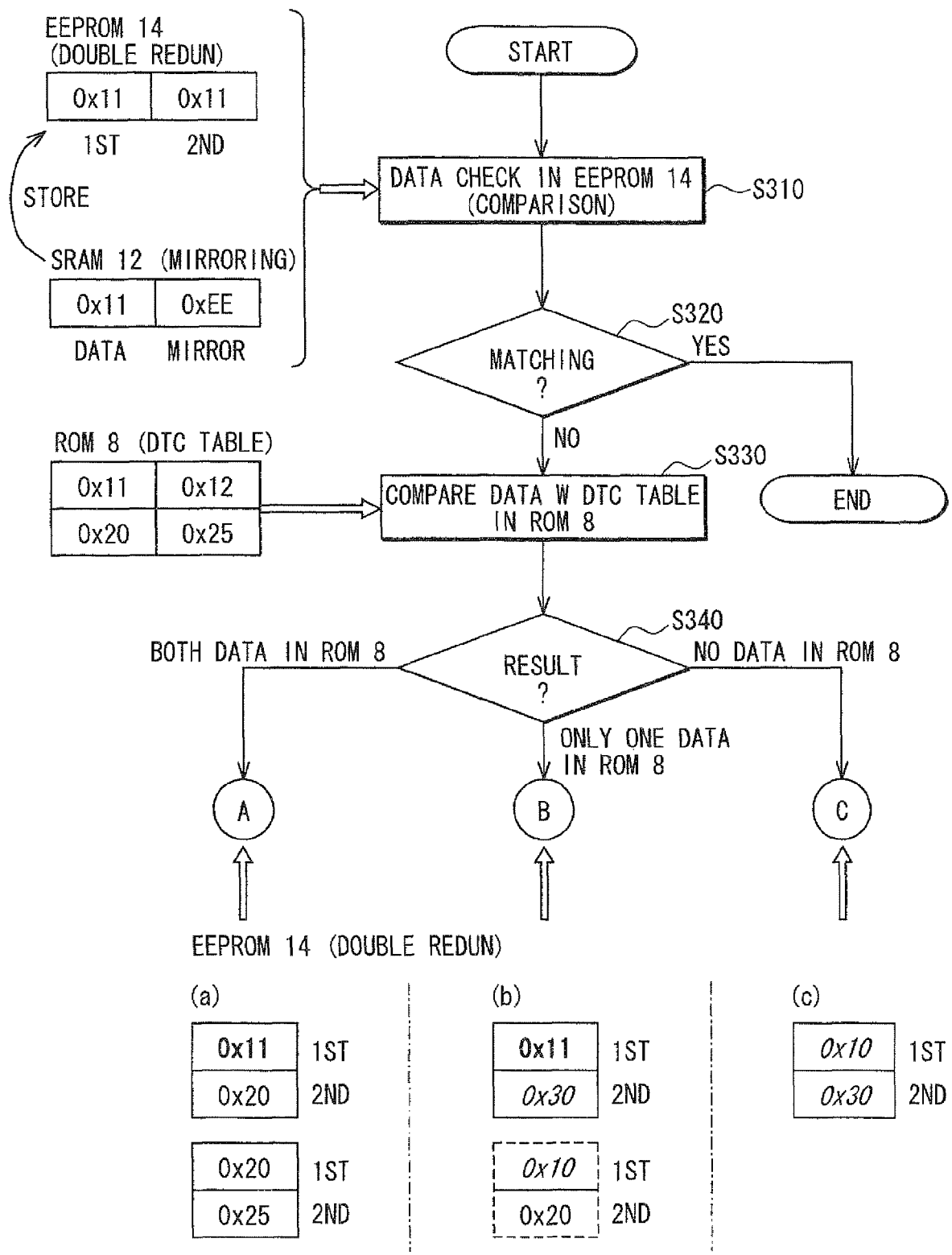
FIG. 4 is a flowchart showing a PDTC reliability checking processing for a PDTC in an EEPROM executed by the CPU of the electronic control unit.

FIG. 4 in the (a) portion illustrates a case that two PDTC's are not matching with each other and both PDTC's are in the DTC table. FIG. 4 in the (b) portion illustrates a case that two PDTC's are not matching with each other and only one of the two PDTC's is in the DTC table. FIG. 4 in the (c) portion illustrates a case that two PDTC's are not matching with each other and none of the two PDTC's is in the DTC table.

The case that two PDTC's are not matching with each other and both PDTC's are in the DTC table is, as shown in FIG. 4 in the (a) portion, further detailed as an upper example in the (a) portion that one of the two data entries (e.g., the second data) is accidentally turned to the DTC included in the DTC table and as a lower example in the (a) portion that both of the two data entries are accidentally turned to the DTC's in the DTC table.

The case that two PDTC's are not matching with each other and only one of the two PDTC's is in the DTC table is further detailed as an upper example in the (b) portion of FIG. 4 that one of the two PDTC's (e.g., the second data) is turned to data that is not included in the DTC table and as a lower example in the (b) portion that one of the two PDTC's respectively being turned (e.g., the second data) is accidentally matching with the DTC data in the DTC table.

The case that two PDTC's are not matching with each other and none of the two PDTC's is in the DTC table is explained as a case in the (c) portion of FIG. 4 that two PDTC's are being turned to two data entries that are not included in the DTC table. The processing of FIG. 5 is explained next.

The processing in FIG. 5 is executed when, as mentioned before, it is determined that the two PDTC's are determined to be in two places in the EEPROM 14 in S340 of the FIG. 4, and at first, the processing of FIG. 5 determines whether abnormality exists in the SRAM 12 in S410. In this step, the abnormality of the SRAM 12 is determined as, for example, loss of the power supply from the vehicle battery by examining if the power supply from the battery is existing. Further, a special keyword is to be memorized in the SRAM 12, and the abnormality of the SRAM 12 is determined based on whether the keyword is correct or not. More practically, if the keyword is not stored in the SRAM 12, or if the keyword is turned to other word or is broken, it is determined that the SRAM 12 has abnormality. Further, the abnormality of the SRAM 12 may be determined by examining that the original data and the mirrored data are in normal conditions with reference to each of the plural DTC's in the DTC storage area, with an examination result that most of the DTC's has inconsistency between the original data and the mirrored data.

When it is determined that abnormality exists in the SRAM 12 in S410 (S410: NO), S460 follows in the processing, and clearing (initialization) is performed on both of the DTC memorized in the SRAM 12 and the PDTC memorized in the EEPROM 14. This is because it is not clear which one of the DTC in the SRAM 12 and the PDTC in the EEPROM 14 should be trusted. In addition, the abnormality of the EEPROM 14 is stored in the SRAM 12 or in the EEPROM 14. Further, because it is possible that the SRAM 12 and the EEPROM 14 has abnormality, the abnormality of the EEPROM 14 may be stored in another memory which is not illustrated.

On the other hand, when it is determined that abnormality does not exist in the SRAM 12 in S410 (S410: YES), the process proceeds to S420, and the DTC in the SRAM 12 and the PDTC in the EEPROM 14 are compared.

Then, S430 follows in the processing, and it is determined whether there is any matching data between the DTC in the SRAM 12 and the PDTC in the EEPROM 14 as a result of comparison in S420. When it is determined that there are no matching data in S430 (S430: NO), S460 follows in the processing. This is because it is not clear which one of the DTC in the SRAM 12 and the PDTC in the EEPROM 14 should be trusted.

On the other hand, when data are determined to be matching in S430 (S430: YES), the process proceeds to S440, and PDTC matching with the DTC in the SRAM 12 is determined as the correct PDTC among the PDTC's in the EEPROM 14. As having been mentioned above in FIG. 2 and FIG. 3, because the CPU 4 stores the DTC in the SRAM 12, and stores the DTC already stored in the SRAM 12 as the PDTC in the EEPROM 14, the DTC stored in the SRAM 12 is an origin of the PDTC in the EEPROM 14. Therefore, among the PDTC in the EEPROM 14, the PDTC matching with the DTC in the SRAM 12 has a higher probability of being a correct data, that is, highly reliable data.

Then, S450 follows subsequently in the processing, and the storage area storing incorrect PDTC is overwritten by the correct PDTC determined in S440. That is, the storage area having the incorrect PDTC (designated as a "false information storage area" in the following description) undergoes the correct PDTC writing process. The rewrite processing is described in FIG. 8. Then, after the rewrite processing in S450, the processing in FIG. 5 is finished.

Figure 8:
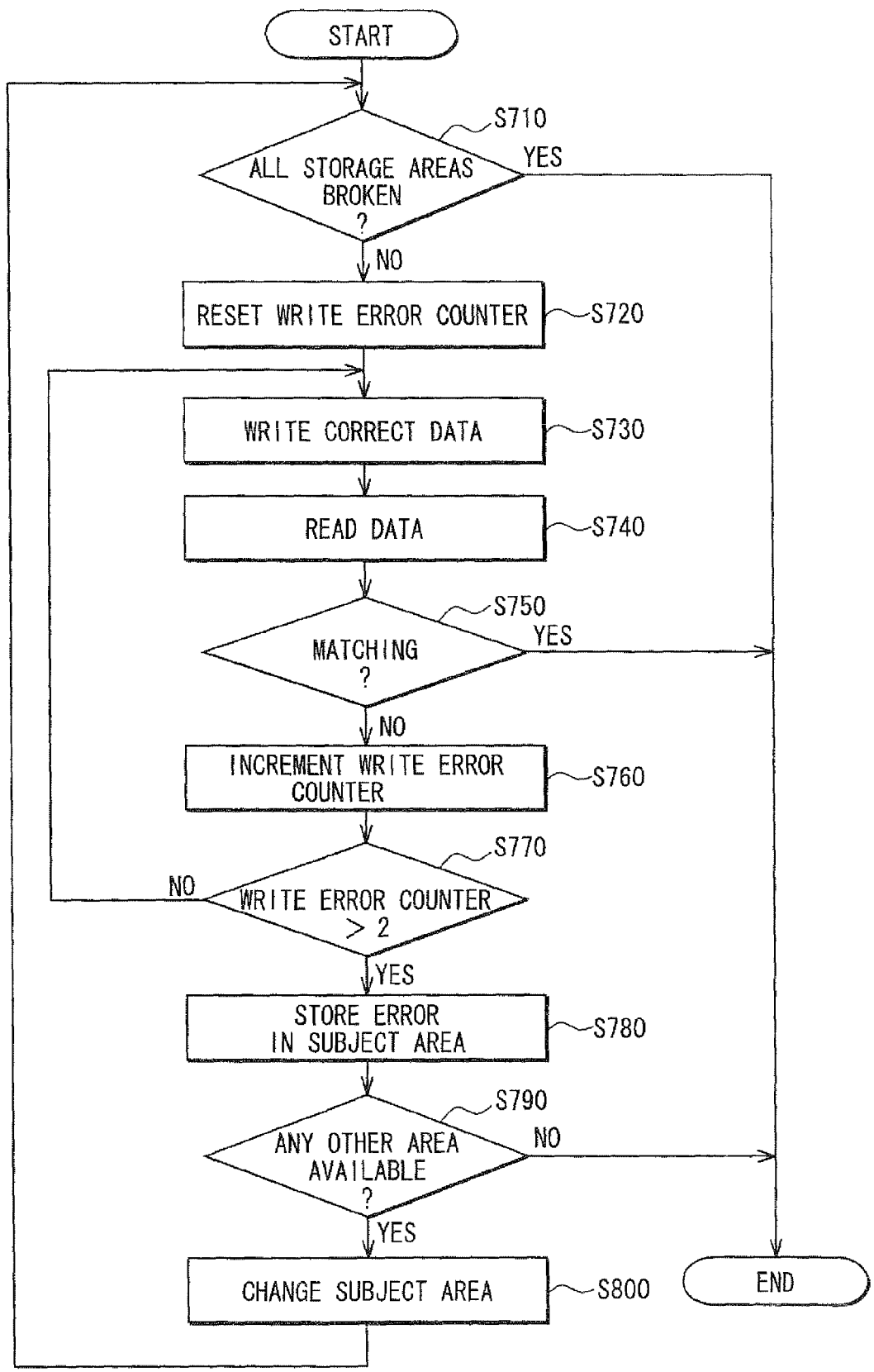
FIG. 8 is a flowchart showing a rewrite processing executed by the CPU of the electronic control unit.

The rewrite processing is explained with reference to FIG. 8. It is determined, in the rewrite processing, whether all of the storage areas in the EEPROM 14 are not broken in S710. In this case, if one or more of the storage areas are broken, information of breakage is stored in a predetermined memory in S780 to be mentioned later. When it is determined that all of the storage areas are broken in S710 (S710: YES), it is determined that rewriting is not possible, and the processing concerned is simply finished.

On the other hand, in S710 if not all of the storage areas are broken, in other words, at least one storage area is not broken (S710: NO), the process proceeds to S720, and resetting of a write error counter (not shown) for counting the number of writing the correct PDTC in the storage areas (or the false information storage area) is performed and the counter value is set to zero.

Then, S730 follows subsequently in the processing, and the correct data (PDTC) is written in the false information storage area. Then, S740 follows subsequently in the processing, and the PDTC written in the false information storage area in S730 is retrieved. Then, S750 follows in the processing, and it is determined whether the PDTC retrieved from the false information storage area in S740 matches with the PDTC written in the false information storage area in S730, and it is determined that the correct PDTC is normally written in the false information storage area upon detecting that the both PDTC's are matching, and the processing concerned is simply finished.

On the other hand, when it is determined that both PDTC's are not matching in S750 (S750: NO), S760 follows in the processing, and the error counter is incremented by 1 count. Then, S770 follows subsequently in the processing, and whether the error counter value is greater than 2 is determined, and the process returns to S730 after determining that the error counter value is not greater than 2 (S770: NO), and the rewrite processing is performed.

On the other hand, when the error counter value is determined to be greater than 2 in S770 (S770: YES), it is determined that rewrite processing cannot be normally performed, and the process proceeds to S780, and the trouble of the storage area that is an object of current rewrite processing is stored in a predetermined memory.

Then, S790 follows in the processing, and it is determined whether there is any other writable area in the EEPROM 14, and writing data is given up if it is determined that there is not writable area (S790: NO), and the processing concerned is simply finished.

On the other hand, when a writable area is determined to be existing in S790 (S790: YES), the process proceeds to S800, and the storage area for storing the correct PDTC is changed to the writable area. Then, the process returns to S710 again.

Figure 6:
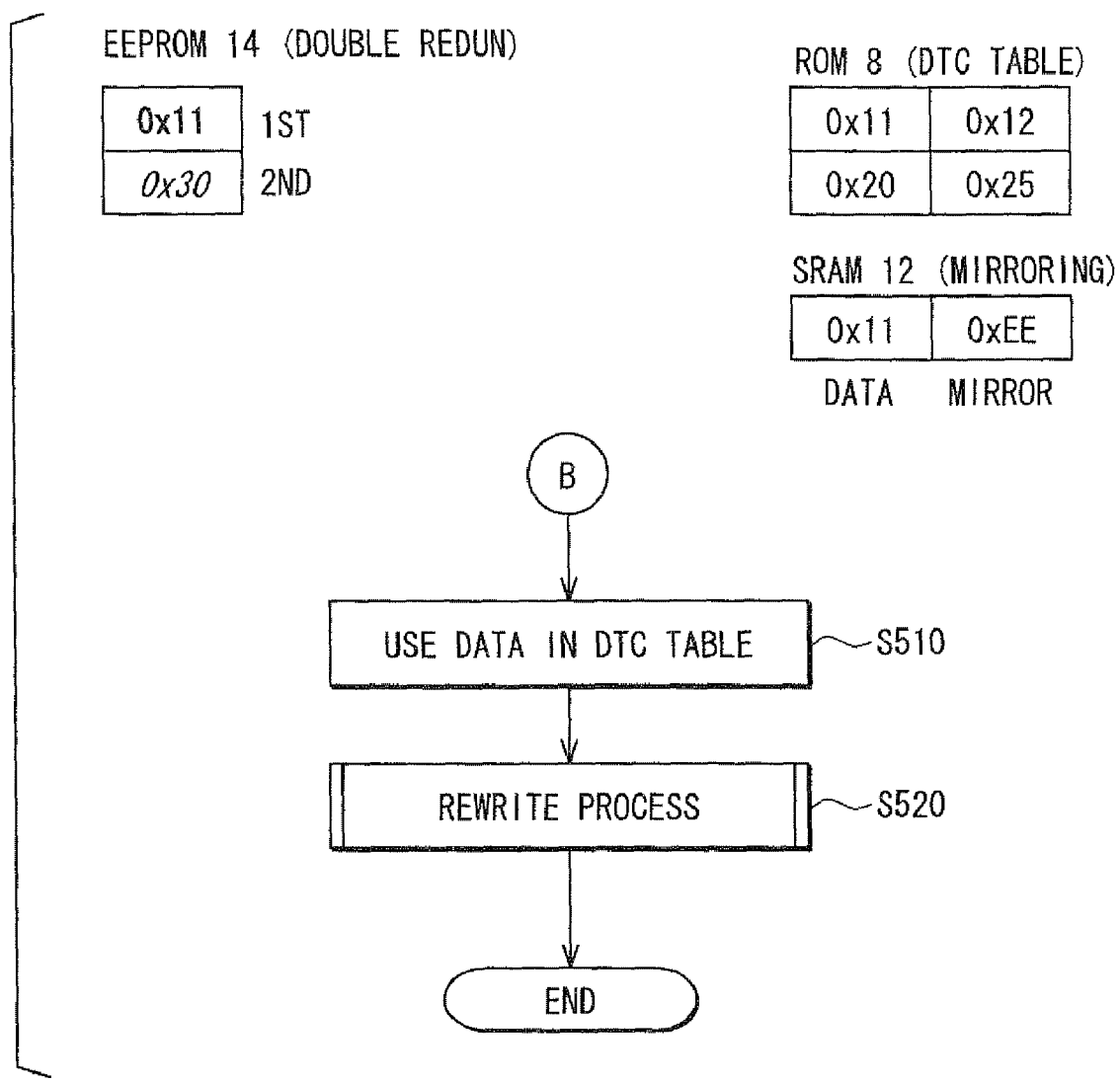
FIG. 6 is yet another flowchart showing a PDTC reliability checking processing for the PDTC in the EEPROM executed by the CPU of the electronic control unit.

Processing of FIG. 6 is explained in the following. The processing of FIG. 6 is a process that is carried out when it is determined that only one of two types of the PDTC is matching with one of the plural DTC types in the DTC table in S340 of the FIG. 4, and the processing of FIG. 6 first determines in S510 that the PDTC included in the DTC table among two types of PDTC as the correct PDTC as mentioned before. Then, S520 follows in the processing, and rewrite processing of FIG. 8 which is mentioned above is carried out. Then, processing of FIG. 6 concerned is finished.

In addition, though it is considered as a very rare case, when only one of the two PDTC's is existing in the DTC table, both of the two PDTC's may be turned to incorrect PDTC's with one of the turned PDTC's matching with the DTC in the DTC table. Therefore, instead of the processing in S550 of FIG. 6, the two PDTC's may be compared with the DTC in the SRAM 12, and the PDTC matching with the DTC may be used as the correct PDTC. In this manner, data reliability is improved.

Figure 7:
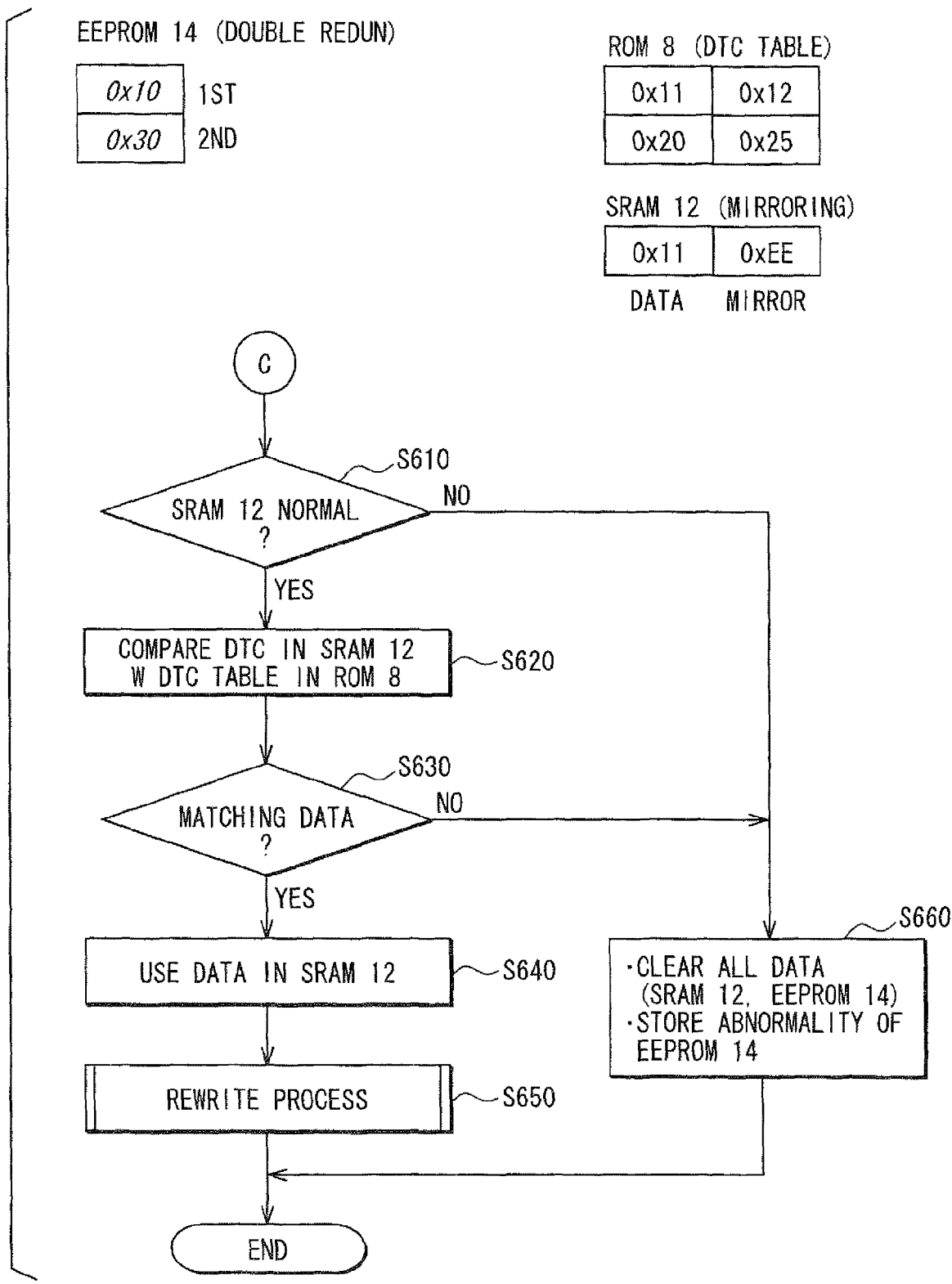
FIG. 7 is still yet another flowchart showing a PDTC reliability checking processing for the PDTC in the EEPROM executed by the CPU of the electronic control unit.

Processing of FIG. 7 is explained in the following. It is a processing that is carried out when it is determined that both of the two PDTC's are included in the DTC table in S340 of the FIG. 4, and the processing of FIG. 7 first determines whether there exists abnormality in the SRAM 12 in S610 as mentioned before. The processing in S610 is same as the processing in S410. Then, S660 follows in the processing when it is determined that some kind of abnormality occurs in the SRAM 12 in S610 (S610: NO). The processing of the S660 is same as the processing in S460.

On the other hand, when it is determined that abnormality does not occur in the SRAM 12 in S610 (S610: YES), S620 follows in the processing, and the DTC in the SRAM 12 and the DTC table in the ROM 8 are compared. This is because both of the two PDTC's in the EEPROM 14 are not reliable due to the lack of their existence in the DTC table, thereby employing the examination whether or not the DTC stored in the SRAM 12 that is an origin of the PDTC stored in the EEPROM 14 is reliable.

Then, S630 follows in the processing, and whether the DTC in the SRAM 12 has any matching data in the DTC table in the ROM 8 is determined based on a comparison result in S620. If there is no matching data (S630: NO), it is determined that the DTC in the SRAM 12 is not reliable, and the process proceeds to S660.

On the other hand, when it is determined in S630 that matching data is found (S630: YES), the process proceeds to S640, and the DTC in the SRAM 12 is used as the correct DTC. Then, S650 follows subsequently in the processing, and the above-mentioned rewrite processing (cf. FIG. 8) is carried out, and then the processing in FIG. 7 is finished.

The triple redundancy method is described with reference to FIGS. 9 to 12 in the following. In this case, the assumption is that 0x11 is stored in three places in the EEPROM 14 and the DTC table has the same configuration as FIG. 2 in the (a) portion.

Figure 9:
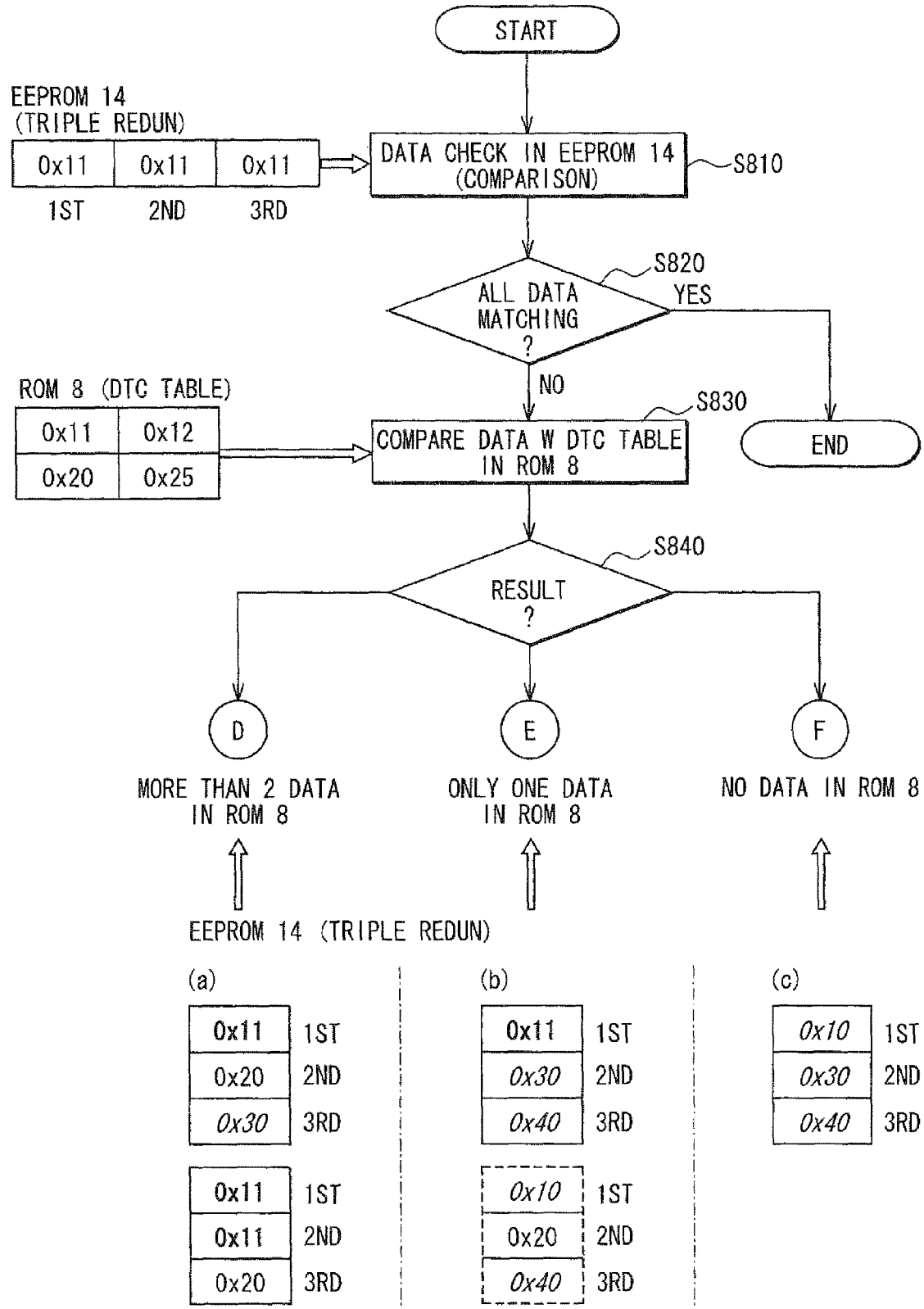
FIG. 9 is a flowchart showing another PDTC reliability checking processing for the PDTC in the EEPROM executed by the CPU of the electronic control unit.

First, in the processing of FIG. 9, the PDTC memorized in three places in the EEPROM 14 is compared in S810. Then, S820 follows subsequently in the processing, and it is determined whether all of the PDTC's in the three places match with each other based on a comparison result of S810. If all of them are determined to be matching (S820: YES), it is determined that there is no abnormality, and the processing concerned is simply finished.

On the other hand, when it is determined that all of the PDTC's in three places do not match in S820 (S820: NO), the process proceeds to S830, and each of the PDTC's stored in three places is respectively compared with the DTC table memorized in the ROM 8. More practically, three PDTC's are respectively examined whether any of plural types of the DTC in the DTC table is matching with one of the PDTC's. Then, in S840, it is determined, based on the comparison result of S830, whether the PDTC's in the three places are included in the DTC table. If more than two types of the three PDTC's are determined to be in the DTC table, the process proceeds to processing of FIG. 10. In addition, the process proceeds to processing of FIG. 11 when it is determined that there is only one kind among the three PDTC's in the DTC table. In addition, processing of FIG. 12 follows in the processing when it is determined that there is no PDTC among three PDTC's in the DTC table.

Further, a case showing that more than two kinds of PDTC's among three PDTC's are in the DTC table is illustrated in FIG. 9 in an (a) portion, a case showing that only one kind of PDTC's among three PDTC's is in the DTC table is illustrated in FIG. 9 in a (b) portion, and a case showing that no PDTC among three PDTC's is in the DTC table is illustrated in FIG. 9 in a (c) portion.

An example of showing that more than two kinds of PTDC's among the three PDTC's is in the DTC table is further detailed as an upper example of the (a) portion of FIG. 9 that two out of three PDTC's (i.e., the second and third data) are turned to different data with one of the two turned data accidentally matching with the DTC in the DTC table, and as a lower example of the (a) portion that one of three PDTC's (i.e., the third data) is accidentally turned to the DTC in the DTC table.

An example of showing that only one of three kinds of PTDC's is in the DTC table is further detailed as an upper example of the (b) portion of FIG. 9 that two out of three PDTC's (i.e., the second and third data) are turned to different data that are not found in the DTC table, and as a lower example of the (b) portion that all of three PDTC's are turned to different data with one of the three turned data (i.e., the second data) accidentally matching with the DTC in the DTC table.

An example of showing that none of three PTDC's is in the DTC table is illustrated as an example of the (c) portion of FIG. 9 that three PDTC's are turned to data that are not in the DTC table.

Figure 10:
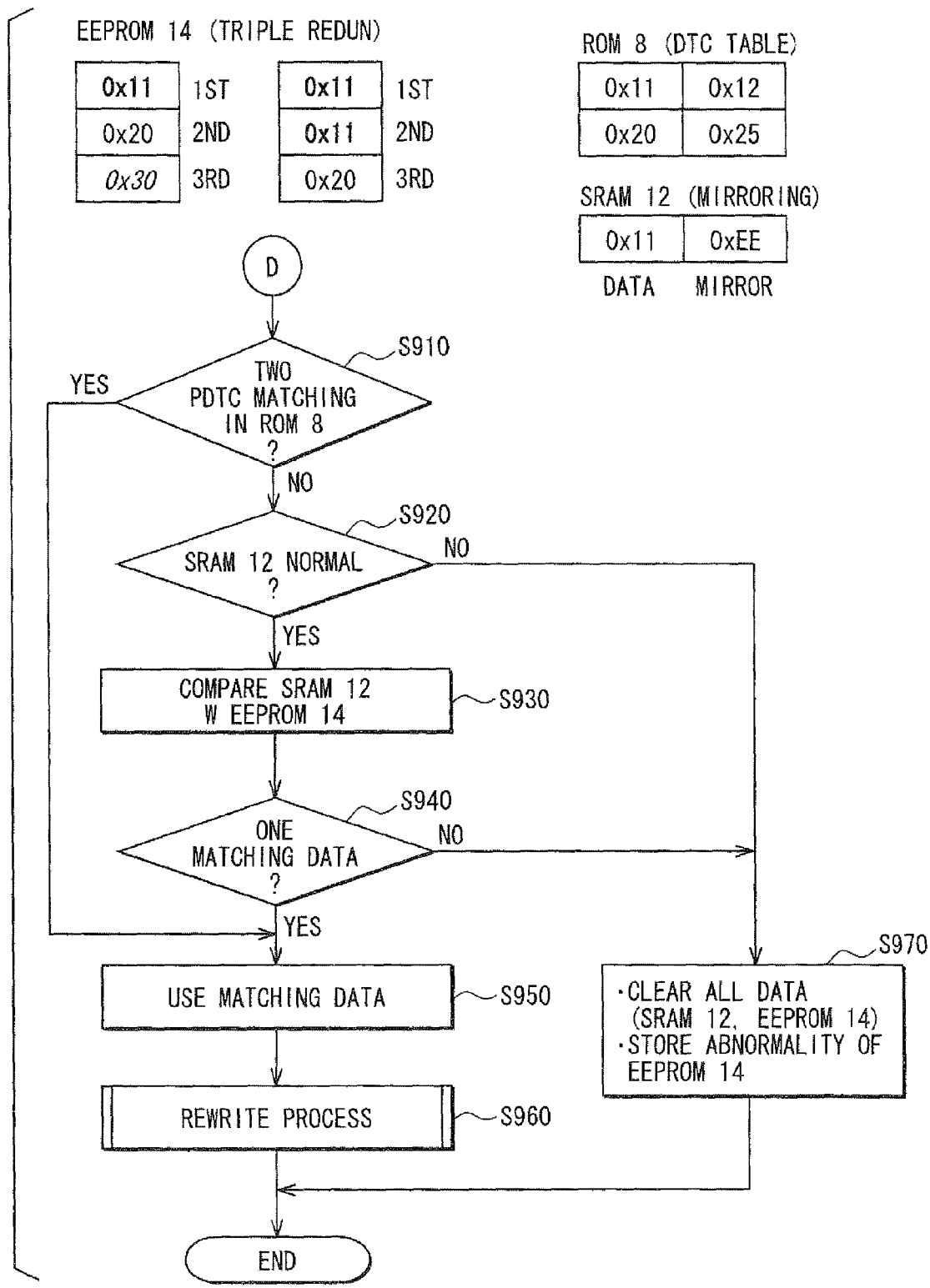
FIG. 10 is another flowchart showing another PDTC reliability checking processing for the PDTC in the EEPROM executed by the CPU of the electronic control unit.

Processing of FIG. 10 is explained in the following.

The processing in FIG. 10 is, as mentioned before, a processing that is executed when more than two kinds of PTDC's among the three PDTC's is determined to be in the DTC table in S840 of FIG. 9. First, in S910, it is determined whether, among PDTC's memorized in the EEPROM 14, matching PDTC is found in two places, and the matching PDTC's in two places are included in the DTC table of the ROM 8.

When it is determined, in S910, that the matching PDTC's in two places are not found, or that existing PDTC's matching in two places are not included in the DTC table of the ROM 8 (S910: NO), the process proceeds to S920.

In S920, it is determined whether abnormality occurs in the SRAM 12, and when it is determined that abnormality occurs (S920: NO), the process proceeds to S970. In S970, clearing (initialization) is performed on both of the DTC memorized in the SRAM 12 and the PDTC memorized in the EEPROM 14, and information that the EEPROM 14 has abnormality is stored in either of the SRAM 12 or the EEPROM 14. In addition, the abnormality information of the EEPROM 14 may be stored in another memory which is not illustrated.

On the other hand, after determining that abnormality does not occur in the SRAM 12 in S920 (S920: YES), the process proceeds to S930, and the DTC in the SRAM 12 and the PDTC in the EEPROM 14 are compared.

Then, S940 follows subsequently in the processing, and it is determined whether any one of the PDTC's in the EEPROM 14 is matching with the DTC in the SRAM 12. If it is determined that no PDTC is matching with the DTC (S940: NO), the process proceeds to S970. The reason is because it is not clear that which one of the DTC in the SRAM 12 and the PDTC in the EEPROM 14 should be trusted.

On the other hand, S950 follows in the processing when at least one of the PDTC's in the EEPROM 14 is matching with the DTC in the SRAM 12 in S940 (S940: YES). In addition, the process proceeds to S950 when it is determined that, among the PDTC's stored in the EEPROM 14, the PDTC's in two places are matching and the PDTC's matching in two places are included in the DTC table in the ROM 8 (S910: YES).

In S950 that follows S910, the PDTC which is included in the DTC table of the ROM 8 with a matching condition in two places is used as the correct PDTC. In addition, in S950 which follows S940, the PDTC in the EEPROM 14 that matches with the DTC in the SRAM 12 is used as the correct PDTC.

Then, S960 follows subsequently in the processing, and rewrite processing (cf. FIG. 8) that is mentioned above is carried out. Then, processing of FIG. 10 is finished. Processing of FIG. 11 is explained in the following.

Figure 11:
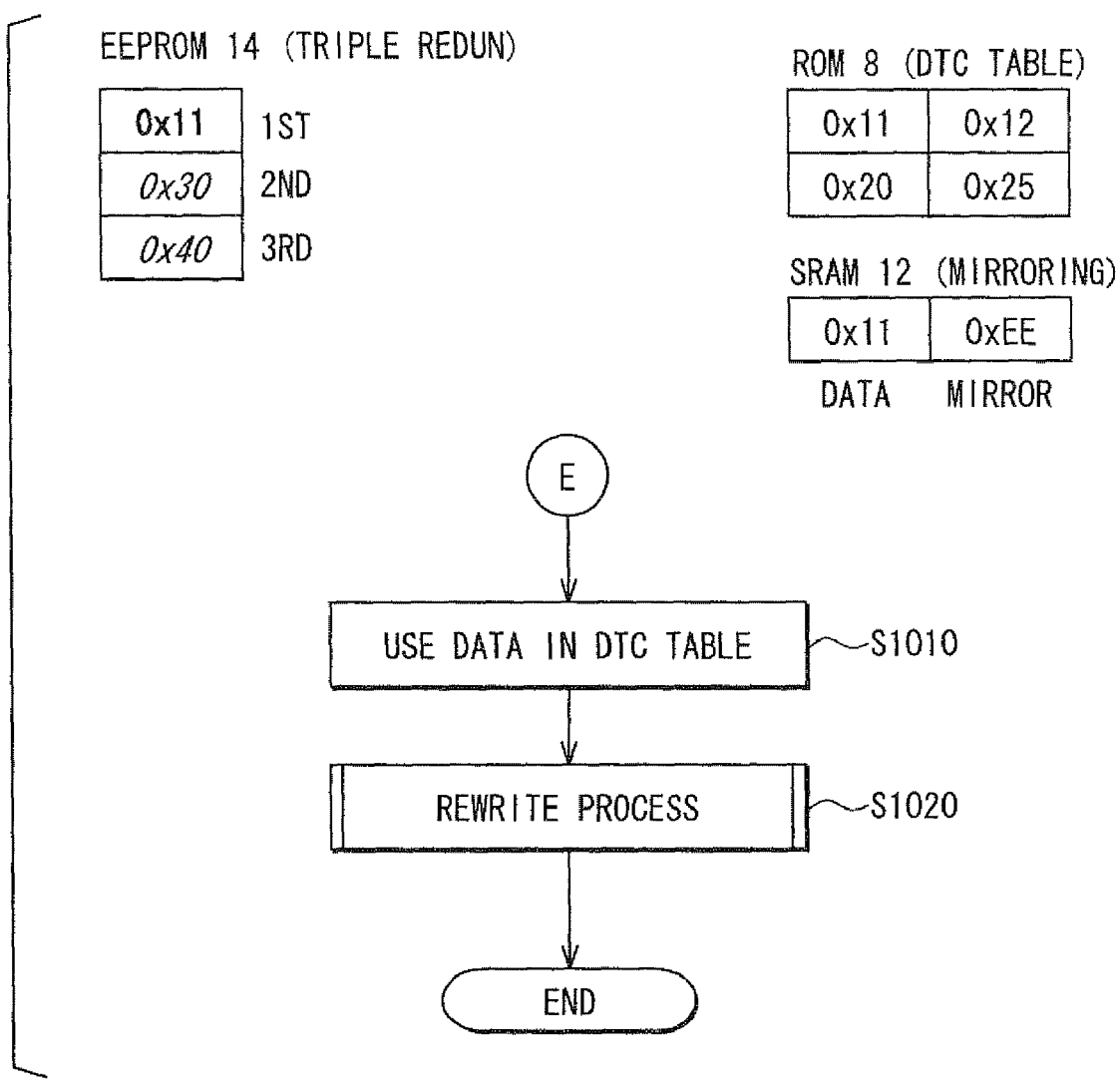
FIG. 11 is yet another flowchart showing another PDTC reliability checking processing for the PDTC in the EEPROM executed by the CPU of the electronic control unit.

The processing in FIG. 11 is, as mentioned before, a processing that is executed when only one kind among the three PDTC's is determined to be matching with one of plural DTC kinds in the DTC table in S840 of FIG. 9. First, the processing uses one kind of PDTC in the DTC table among three PDTC's as the correct PDTC in S1010.

The process proceeds to S1020 after S1010, and rewrite processing (cf. FIG. 8) that is mentioned above is carried out. Then, processing of FIG. 11 is finished. In addition, though it is considered as a very rare case, when only one of the three PDTC's is existing in the DTC table, all of the three PDTC's may be turned to incorrect PDTC's with one of the turned PDTC's accidentally matching with the DTC in the DTC table. Therefore, instead of the processing in S1010 of FIG. 11, the three PDTC's may be compared with the DTC in the SRAM 12, and the PDTC matching with the DTC may be used as the correct PDTC. In this manner, data reliability is improved.

Figure 12:
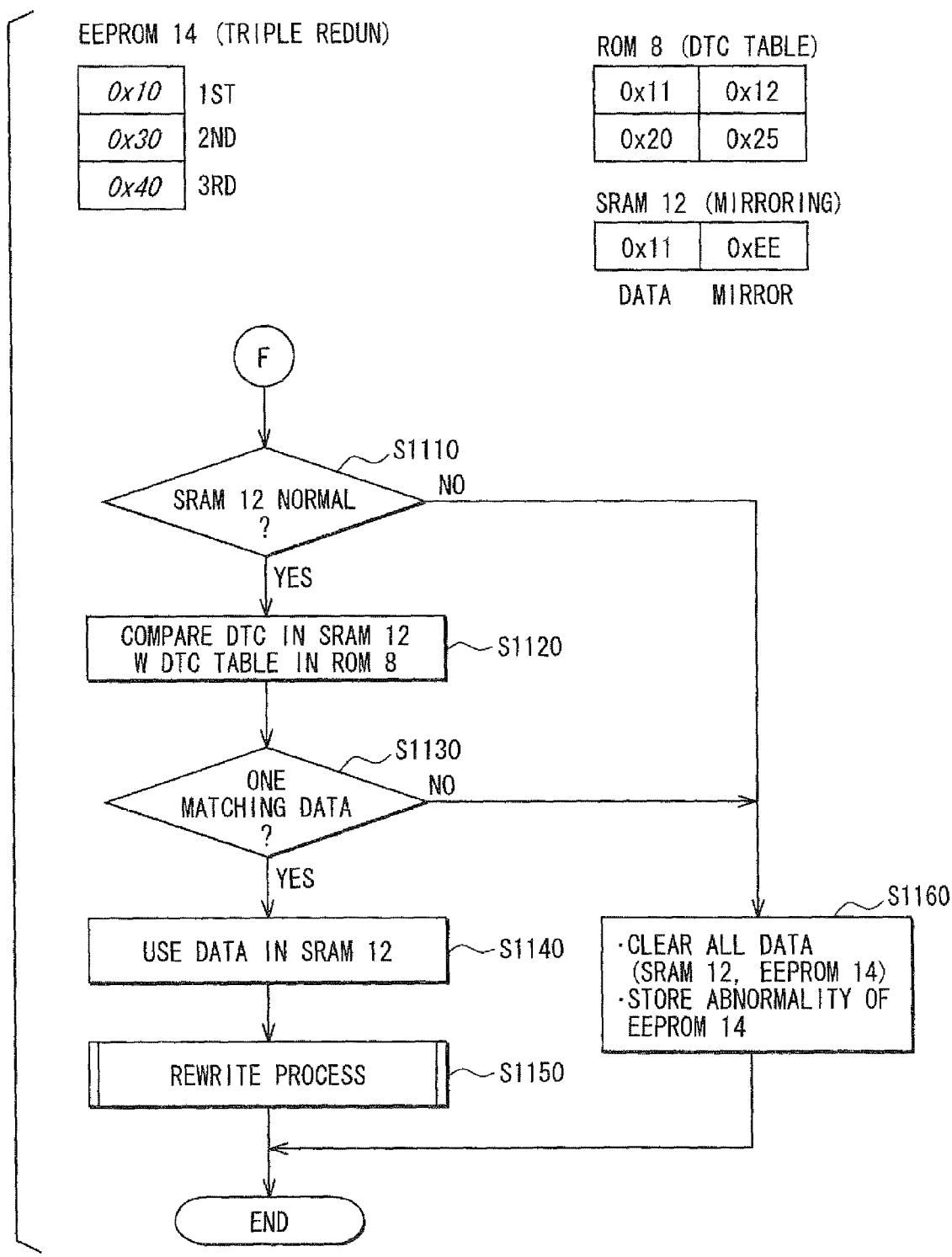
FIG. 12 is still yet another flowchart showing another PDTC reliability checking processing for the PDTC in the EEPROM executed by the CPU of the electronic control unit.

Processing of FIG. 12 is explained in the following. It is the processing that is carried out when it is determined that none of the three PDTC's exists in S840 of the FIG. 9 as mentioned before, and the processing of FIG. 12 determines whether abnormality exists in the SRAM 12 in S1110. The processing of the S1110 is same as the above-mentioned processing S410 (or, as the processing S610). When it is determined that some kind of abnormality occurs in the SRAM 12 in S1110 (S1110: NO), the process proceeds to S1160, and clearing (initialization) of the DTC memorized in the SRAM 12 and the PDTC in the EEPROM 14 is performed, and information that the EEPROM 14 has abnormality is stored in the SRAM 12 or the EEPROM 14. In addition, the information of the abnormality of the EEPROM 14 may be stored in another memory which is not illustrated.

On the other hand, when it is determined that abnormality does not occur in the SRAM 12 in S1110 (S1110: YES), S1120 follows in the processing, and the DTC in the SRAM 12 and the DTC table in the ROM 8 are compared. This is because none of the three PDTC's is not reliable due to the lack of their existence in the DTC table, thereby employing the examination whether or not the DTC stored in the SRAM 12 that is an origin of the PDTC stored in the EEPROM 14 is reliable.

Then, S1130 follows in the processing, and whether there is any matching data is determined in S1120 based on the comparison result between the DTC in the SRAM 12 and the DTC table of the ROM 8. If it is determined that there is no matching data (S1130: NO), the process proceeds to S1160 by determining that the DTC in the SRAM 12 is not reliable.

On the other hand, if it is determined that there is matching data in S1130 (S1130: YES), the process proceeds to S1140, and the DTC in the SRAM 12 is used as the correct DTC. Then, S1150 follows subsequently in the processing, and the above-mentioned rewrite processing (cf. FIG. 8) is carried out, and processing of the FIG. 12 is finished.

The reliability of data (a trouble code) of the EEPROM 14 is improved, as mentioned above in the present embodiment, by storing the trouble code indicating the trouble of the vehicle in the respectively different areas of the EEPROM 14 and by determining that the trouble code is correct based on the matching of all codes in the different areas.

In addition, even when the trouble code stored in the EEPROM 14 is turned to a different code to break the consistency among the codes in the different areas, the correct trouble code is verified by comparing the trouble code table to be stored in the EEPROM 14 with the trouble code in the EEPROM 14 as long as the correct trouble code is maintained in the EEPROM 14. The above reasoning is further verified based on an argument that the trouble code in the EEPROM 14 is determined to be false if the code is not included in the trouble code table.

Further, even when the correct trouble code is not maintained in the EEPROM 14, the reliability can be assured by comparing the trouble code in the SRAM 12 that is used as original data of the trouble code in the EEPROM 14 and the trouble code table and determining that matching code is the correct code.

Furthermore, when the EEPROM 14 stores plural types of trouble codes that are included in the trouble code table, which one from among the trouble codes in the EEPROM 14 is the correct trouble code can be recognized by comparing the trouble code in the EEPROM 14 with the trouble code in the SRAM 12. As mentioned before, because the same trouble code is stored in the SRAM 12 as the code stored in the EEPROM 14, the trouble codes in the EEPROM 14 can be determined as correct when they match with the trouble code in the SRAM.

Furthermore, because the trouble code table is memorized in the ROM 8, it is prevented from being rewritten and safely used. In addition, in the present embodiment, processing of S150 and S220 is equivalent to a memory management unit, processing of S310, S320, S810 and S820 is equivalent to an error detection unit processing of S420-S440, S510, S620-S640, S930-S950, S1010 and S1120-S1140 is equivalent to an authentication unit, processing of FIG. 8, that is, processing of S730-S750 in particular is equivalent to rewrite means in particular, and the CPU 4 is equivalent to both of a trip term operation control unit and a code request operation control unit.

Although the present invention has been fully described in connection with the preferred embodiment thereof with reference to the accompanying drawings, it is to be noted that various changes and modifications will become apparent to those skilled in the art.

For example, in the above embodiment, the storage of the fault code for representing the vehicle break-down is taken as an example. However, the storage of other kinds of information may be implemented in the same manner.

In addition, though it may be a very rare case, there still is a chance that two DTC's in two different places are accidentally turned to the same PDTC's, thereby leading to a determination that the two PDTC's are matching with each other in S320 of FIG. 4. Therefore, even when the PDTC's in two places are matching, the PDTC's in two places may respectively be compared with the DTC stored in the ROM 8 just like the process in S330. In other words, the PDTC's may be determined to be correct after confirming that both PDTC's are included in the DTC table. In this manner, the reliability of the data may further be improved. The above modification may also be applicable to the triple redundancy method. That is, even when all of the PDTC's in three places are determined to be matching in S820 of FIG. 9, the PDTC's may be compared with the DTC table in the ROM 8 as in S830. In other words, the PDTC's may be determined to be having no abnormality (i.e., correct) after confirming that the PDTC's are included in the DTC table.

In addition, the storage area for store rewriting PDTC data is switched with other storage area (S800) when the storage area is determined to have some defects (S770: YES) and is not capable of storing the PDTC data in the process of FIG. 8. However, the process in FIG. 8 may be finished without switching the storage area.

In addition, though the mirrored DTC data is stored in the SRAM 12 in the above embodiment, the mirrored DTC data may not be stored. In this manner, the memory resource of the SRAM 12 is saved. Further, instead of storing the mirrored data, duplicated original data may be stored in the SRAM 12.

Such changes and modifications are to be understood as being within the scope of the present invention as defined by the appended claims.

What is claimed is:

1. A fault code memory management apparatus comprising:
   a memory management unit configured to store a same fault code of a detection object in a vehicle at different memory areas of a non-volatile memory, wherein the fault code of the detection object represents a detected fault of the detection object, and wherein information in the non-volatile memory is both readable and writable;
   an error detection unit configured to detect an error of the fault code in the non-volatile memory upon detecting discrepancy of at least one of the same fault codes stored at the different memory areas through performing a matching of the fault codes;
   an information table memory configured to store a fault code table to be stored in the non-volatile memory, wherein the fault code table is an information table that includes the fault codes; and
   an authentication unit configured to authenticate the fault code as a genuine fault code by comparing each of the fault codes stored at different areas in the non-volatile memory with the fault codes included in the fault code table when the error detection unit at least detects the error as a discrepancy of the fault code in the non-volatile memory, wherein the fault code is determined as the genuine fault code when the authentication unit recognizes that the fault code is included in the fault code table.

2. The fault code memory management apparatus of claim 1, wherein
   the memory management unit is configured to store the same fault codes at two different areas of the non-volatile memory.

3. The fault code memory management apparatus of claim 2, wherein
   the information table memory is a read-only memory (ROM).

4. The fault code memory management apparatus of claim 2 further comprising:
   a rewrite unit configured to store the fault code that is authenticated by the authentication unit to a memory area in the non-volatile memory which stores non-authenticated fault code.

5. The fault code memory management apparatus of claim 2, wherein
   a standby random-access memory (SRAM) that maintains information while supply of an electronic voltage lasts is included in the fault code memory management apparatus,
   the memory management unit is configured to store the fault code in the non-volatile memory after storing the same fault code in the SRAM, and
   when any of the fault codes in the non-volatile memory is not determined to be included in the fault code table by the authentication unit, the authentication unit authenticates the fault code in the SRAM as the genuine fault code on a condition that the authentication unit recognizes that the fault code in the SRAM is included in the fault code table.

6. The fault code memory management apparatus of claim 2, wherein
   a standby random-access memory (SRAM) that maintains information while supply of an electronic voltage lasts is included in the fault code memory management apparatus,
   the memory management unit is configured to store the fault code in the non-volatile memory after storing the same fault code in the SRAM, and
   when the error of the fault code is detected at least by the error detection unit, the authentication unit recognizes the fault code that matches with the fault code stored in the SRAM as the genuine fault code in a prioritized manner based on an examination whether each of the fault codes stored in the non-volatile memory matches with the fault code stored in the SRAM.

7. The fault code memory management apparatus of claim 2 further comprising:
   a trip term operation control unit for operating the error detection unit and the authentication unit in a trip term that is defined at least as one of a period between a turning-on of an ignition switch of the vehicle and a subsequent turning-on of the ignition switch, and a period between a turning-on and a turning-off of the ignition switch of the vehicle.

8. The fault code memory management apparatus of claim 2, wherein
   the fault code memory management apparatus is configured to be connectable to an external diagnosis device for a diagnosis of a condition of the detection object, and
   the fault code memory management apparatus further comprises a code request operation control unit configured to operate the error detection unit and the authentication unit upon receiving a request for the fault code at least from the external diagnosis device.

9. The fault code memory management apparatus of claim 1, wherein
   the memory management unit is configured to store the same fault codes at three different areas of the non-volatile memory.

10. The fault code memory management apparatus of claim 9, wherein
    the authentication unit is configured to authenticate the fault code as the genuine fault code when matching fault codes stored at a majority of the different areas in the non-volatile memory are determined to be in the fault code table.

11. The fault code memory management apparatus of claim 10, wherein
    the information table memory is a read-only memory (ROM).

12. The fault code memory management apparatus of claim 10 further comprising:
    a rewrite unit configured to store the fault code that is authenticated by the authentication unit to a memory area in the non-volatile memory which stores non-authenticated fault code.

13. The fault code memory management apparatus of claim 10, wherein
    a standby random-access memory (SRAM) that maintains information while supply of an electronic voltage lasts is included in the fault code memory management apparatus, the memory management unit is configured to store the fault code in the non-volatile memory after storing the same fault code in the SRAM, and when any of the fault codes in the non-volatile memory is not determined to be included in the fault code table by the authentication unit, the authentication unit authenticates the fault code in the SRAM as the genuine fault code on a condition that the authentication unit recognizes that the fault code in the SRAM is included in the fault code table.

14. The fault code memory management apparatus of claim 10, wherein a standby random-access memory (SRAM) that maintains information while supply of an electronic voltage lasts is included in the fault code memory management apparatus, the memory management unit is configured to store the fault code in the non-volatile memory after storing the same fault code in the SRAM, and when the error of the fault code is detected at least by the error detection unit, the authentication unit recognizes the fault code that matches with the fault code stored in the SRAM as the genuine fault code in a prioritized manner based on an examination whether each of the fault codes stored in the non-volatile memory matches with the fault code stored in the SRAM.

15. The fault code memory management apparatus of claim 10 further comprising:

a trip term operation control unit for operating the error detection unit and the authentication unit in a trip term that is defined at least as one of a period between a turning-on of an ignition switch of the vehicle and a subsequent turning-on of the ignition switch, and a period between a turning-on and a turning-off of the ignition switch of the vehicle.

16. The fault code memory management apparatus of claim 10, wherein the fault code memory management apparatus is configured to be connectable to an external diagnosis device for a diagnosis of a condition of the detection object, and the fault code memory management apparatus further comprises a code request operation control unit configured to operate the error detection unit and the authentication unit upon receiving a request for the fault code at least from the external diagnosis device.

17. The fault code memory management apparatus of claim 9, wherein the information table memory is a read-only memory (ROM).

18. The fault code memory management apparatus of claim 9 further comprising:

a rewrite unit configured to store the fault code that is authenticated by the authentication unit to a memory area in the non-volatile memory which stores non-authenticated fault code.

19. The fault code memory management apparatus of claim 9, wherein a standby random-access memory (SRAM) that maintains information while supply of an electronic voltage lasts is included in the fault code memory management apparatus, the memory management unit is configured to store the fault code in the non-volatile memory after storing the same fault code in the SRAM, and when any of the fault codes in the non-volatile memory is not determined to be included in the fault code table by the authentication unit, the authentication unit authenticates the fault code in the SRAM as the genuine fault code on a condition that the authentication unit recognizes that the fault code in the SRAM is included in the fault code table.

20. The fault code memory management apparatus of claim 9, wherein a standby random-access memory (SRAM) that maintains information while supply of an electronic voltage lasts is included in the fault code memory management apparatus, the memory management unit is configured to store the fault code in the non-volatile memory after storing the same fault code in the SRAM, and when the error of the fault code is detected at least by the error detection unit, the authentication unit recognizes the fault code that matches with the fault code stored in the SRAM as the genuine fault code in a prioritized manner based on an examination whether each of the fault codes stored in the non-volatile memory matches with the fault code stored in the SRAM.

21. The fault code memory management apparatus of claim 9 further comprising:

a trip term operation control unit for operating the error detection unit and the authentication unit in a trip term that is defined at least as one of a period between a turning-on of an ignition switch of the vehicle and a subsequent turning-on of the ignition switch, and a period between a turning-on and a turning-off of the ignition switch of the vehicle.

22. The fault code memory management apparatus of claim 9, wherein the fault code memory management apparatus is configured to be connectable to an external diagnosis device for a diagnosis of a condition of the detection object, and the fault code memory management apparatus further comprises a code request operation control unit configured to operate the error detection unit and the authentication unit upon receiving a request for the fault code at least from the external diagnosis device.

23. The fault code memory management apparatus of claim 1, wherein the information table memory is a read-only memory (ROM).

24. The fault code memory management apparatus of claim 23 further comprising:

a rewrite unit configured to store the fault code that is authenticated by the authentication unit to a memory area in the non-volatile memory which stores non-authenticated fault code.

25. The fault code memory management apparatus of claim 23, wherein a standby random-access memory (SRAM) that maintains information while supply of an electronic voltage lasts is included in the fault code memory management apparatus, the memory management unit is configured to store the fault code in the non-volatile memory after storing the same fault code in the SRAM, and when any of the fault codes in the non-volatile memory is not determined to be included in the fault code table by the authentication unit, the authentication unit authenticates the fault code in the SRAM as the genuine fault code on a condition that the authentication unit recognizes that the fault code in the SRAM is included in the fault code table.

26. The fault code memory management apparatus of claim 23, wherein a standby random-access memory (SRAM) that maintains information while supply of an electronic voltage lasts is included in the fault code memory management apparatus, the memory management unit is configured to store the fault code in the non-volatile memory after storing the same fault code in the SRAM, and when the error of the fault code is detected at least by the error detection unit, the authentication unit recognizes the fault code that matches with the fault code stored in the SRAM as the genuine fault code in a prioritized manner based on an examination whether each of the fault codes stored in the non-volatile memory matches with the fault code stored in the SRAM.

27. The fault code memory management apparatus of claim 23 further comprising:

a trip term operation control unit for operating the error detection unit and the authentication unit in a trip term that is defined at least as one of a period between a turning-on of an ignition switch of the vehicle and a subsequent turning-on of the ignition switch, and a period between a turning-on and a turning-off of the ignition switch of the vehicle.

28. The fault code memory management apparatus of claim 23, wherein the fault code memory management apparatus is configured to be connectable to an external diagnosis device for a diagnosis of a condition of the detection object, and the fault code memory management apparatus further comprises a code request operation control unit configured to operate the error detection unit and the authentication unit upon receiving a request for the fault code at least from the external diagnosis device.

29. The fault code memory management apparatus of claim 1 further comprising:

a rewrite unit configured to store the fault code that is authenticated by the authentication unit to a memory area in the non-volatile memory which stores non-authenticated fault code.

30. The fault code memory management apparatus of claim 29, wherein a standby random-access memory (SRAM) that maintains information while supply of an electronic voltage lasts is included in the fault code memory management apparatus, the memory management unit is configured to store the fault code in the non-volatile memory after storing the same fault code in the SRAM, and when any of the fault codes in the non-volatile memory is not determined to be included in the fault code table by the authentication unit, the authentication unit authenticates the fault code in the SRAM as the genuine fault code on a condition that the authentication unit recognizes that the fault code in the SRAM is included in the fault code table.

31. The fault code memory management apparatus of claim 29, wherein a standby random-access memory (SRAM) that maintains information while supply of an electronic voltage lasts is included in the fault code memory management apparatus, the memory management unit is configured to store the fault code in the non-volatile memory after storing the same fault code in the SRAM, and when the error of the fault code is detected at least by the error detection unit, the authentication unit recognizes the fault code that matches with the fault code stored in the SRAM as the genuine fault code in a prioritized manner based on an examination whether each of the fault codes stored in the non-volatile memory matches with the fault code stored in the SRAM.

32. The fault code memory management apparatus of claim 29 further comprising:

a trip term operation control unit for operating the error detection unit and the authentication unit in a trip term that is defined at least as one of a period between a turning-on of an ignition switch of the vehicle and a subsequent turning-on of the ignition switch, and a period between a turning-on and a turning-off of the ignition switch of the vehicle.

33. The fault code memory management apparatus of claim 29, wherein the fault code memory management apparatus is configured to be connectable to an external diagnosis device for a diagnosis of a condition of the detection object, and the fault code memory management apparatus further comprises a code request operation control unit configured to operate the error detection unit and the authentication unit upon receiving a request for the fault code at least from the external diagnosis device.

34. The fault code memory management apparatus of claim 1, wherein a standby random-access memory (SRAM) that maintains information while supply of an electronic voltage lasts is included in the fault code memory management apparatus, the memory management unit is configured to store the fault code in the non-volatile memory after storing the same fault code in the SRAM, and when any of the fault codes in the non-volatile memory is not determined to be included in the fault code table by the authentication unit, the authentication unit authenticates the fault code in the SRAM as the genuine fault code on a condition that the authentication unit recognizes that the fault code in the SRAM is included in the fault code table.

35. The fault code memory management apparatus of claim 34, wherein a standby random-access memory (SRAM) that maintains information while supply of an electronic voltage lasts is included in the fault code memory management apparatus, the memory management unit is configured to store the fault code in the non-volatile memory after storing the same fault code in the SRAM, and when the error of the fault code is detected at least by the error detection unit, the authentication unit recognizes the fault code that matches with the fault code stored in the SRAM as the genuine fault code in a prioritized manner based on an examination whether each of the fault codes stored in the non-volatile memory matches with the fault code stored in the SRAM.

36. The fault code memory management apparatus of claim 34 further comprising:

a trip term operation control unit for operating the error detection unit and the authentication unit in a trip term that is defined at least as one of a period between a turning-on of an ignition switch of the vehicle and a subsequent turning-on of the ignition switch, and a period between a turning-on and a turning-off of the ignition switch of the vehicle.

37. The fault code memory management apparatus of claim 34, wherein the fault code memory management apparatus is configured to be connectable to an external diagnosis device for a diagnosis of a condition of the detection object, and the fault code memory management apparatus further comprises a code request operation control unit configured to operate the error detection unit and the authentication unit upon receiving a request for the fault code at least from the external diagnosis device.

38. The fault code memory management apparatus of claim 1, wherein a standby random-access memory (SRAM) that maintains information while supply of an electronic voltage lasts is included in the fault code memory management apparatus, the memory management unit is configured to store the fault code in the non-volatile memory after storing the same fault code in the SRAM, and when the error of the fault code is detected at least by the error detection unit, the authentication unit recognizes the fault code that matches with the fault code stored in the SRAM as the genuine fault code in a prioritized manner based on an examination whether each of the fault codes stored in the non-volatile memory matches with the fault code stored in the SRAM.

39. The fault code memory management apparatus of claim 38 further comprising:

a trip term operation control unit for operating the error detection unit and the authentication unit in a trip term that is defined at least as one of a period between a turning-on of an ignition switch of the vehicle and a subsequent turning-on of the ignition switch, and a period between a turning-on and a turning-off of the ignition switch of the vehicle.

40. The fault code memory management apparatus of claim 38, wherein the fault code memory management apparatus is configured to be connectable to an external diagnosis device for a diagnosis of a condition of the detection object, and the fault code memory management apparatus further comprises a code request operation control unit configured to operate the error detection unit and the authentication unit upon receiving a request for the fault code at least from the external diagnosis device.

41. The fault code memory management apparatus of claim 1 further comprising:

a trip term operation control unit configured to operate the error detection unit and the authentication unit in a trip term that is defined at least as one of a period between a turning-on of an ignition switch of the vehicle and a subsequent turning-on of the ignition switch, and a period between a turning-on and a turning-off of the ignition switch of the vehicle.

42. The fault code memory management apparatus of claim 41, wherein the fault code memory management apparatus is configured to be connectable to an external diagnosis device for a diagnosis of a condition of the detection object, and the fault code memory management apparatus further comprises a code request operation control unit configured to operate the error detection unit and the authentication unit upon receiving a request for the fault code at least from the external diagnosis device.

43. The fault code memory management apparatus of claim 1, wherein the fault code memory management apparatus is configured to be connectable to an external diagnosis device for a diagnosis of a condition of the detection object, and the fault code memory management apparatus further comprises a code request operation control unit configured to operate the error detection unit and the authentication unit upon receiving a request for the fault code at least from the external diagnosis device.

44. A fault code memory management apparatus comprising:

a fault code memory configured to store an information table that at least serves as a fault code table by including fault codes;

a memory management unit configured to store same fault codes at different plural areas in a non-volatile memory that stores information in a readable and writable manner, wherein storage of the same fault codes is performed when a diagnosis of a subject vehicular device being diagnosed leads to a detection of an error that is represented by a fault code included in the fault code table; and an authentication unit configured to recognize that a fault code is a genuine fault code based on a condition that the fault code stored in the non-volatile memory matches with the fault code included in the fault code table after comparing each of the fault codes stored in the different plural areas of the non-volatile memory with the fault codes included in the fault code table, wherein an authentication of the fault code is performed by the authentication unit when a discrepancy of at least one of the fault codes is found after the fault codes are retrieved from the different plural areas for an examination of matching of the retrieved fault codes.

45. A memory management apparatus comprising;

a memory control unit configured to store same data at different areas of the non-volatile memory that stores information in a readable and writable manner;

an error detection unit configured to detect an error of the data in the non-volatile memory upon detecting discrepancy among at least one of the same data stored at different areas through performing a matching of the data;

a data table memory configured to store a data table to be stored in the non-volatile memory, wherein the data table is a table that includes the data; and an authentication unit configured to store authenticate the data as a genuine data by comparing each of the data stored in the non-volatile memory with the data included in the data table when the error detection unit detects the error of the data in the non-volatile memory upon detecting said discrepancy, wherein the data is determined as the genuine data when the authentication unit recognizes that the data is included in the data table.

* * * * *